United States Patent
Tanaka

(10) Patent No.: US 8,032,606 B2
(45) Date of Patent: *Oct. 4, 2011

(54) DISK CONTROL UNIT AND STORAGE SYSTEM

(75) Inventor: Atsushi Tanaka, Saitama (JP)

(73) Assignee: Hitachi, Ltd., Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 12/533,310

(22) Filed: Jul. 31, 2009

(65) Prior Publication Data

US 2009/0292868 A1    Nov. 26, 2009

Related U.S. Application Data

(63) Continuation of application No. 10/923,732, filed on Aug. 24, 2004, now Pat. No. 7,600,047, which is a continuation of application No. 10/852,111, filed on May 25, 2004, now Pat. No. 7,302,498.

(30) Foreign Application Priority Data

Mar. 22, 2004  (JP) ................................ 2004-082824

(51) Int. Cl.
G06F 15/167  (2006.01)
G06F 15/16   (2006.01)
G06F 13/00   (2006.01)
G06F 13/12   (2006.01)
G01D 1/00    (2006.01)

(52) U.S. Cl. .......... 709/216; 709/250; 711/147; 710/74; 702/122

(58) Field of Classification Search .................. 709/216, 709/250; 711/147; 710/74; 702/122

See application file for complete search history.

(56) References Cited

U.S. PATENT DOCUMENTS

| 5,845,319 | A  | 12/1998 | Yorimitsu |
| 5,996,024 | A  | 11/1999 | Blumenau |
| 6,092,066 | A  | 7/2000  | Ofek |
| 6,389,432 | B1 | 5/2002  | Pothapragada et al. |
| 6,738,854 | B2 * | 5/2004 | Hoese et al. ................. 710/315 |
| 6,864,991 | B1 | 3/2005  | Takahashi |

(Continued)

FOREIGN PATENT DOCUMENTS

JP    2001014112    1/2001

(Continued)

OTHER PUBLICATIONS

IBM Storage Tank, A Distributed Storage System, IBM Corporation, Jan. 24, 2002, pp. 1-16.

*Primary Examiner* — Ranodhi Serrao

(74) *Attorney, Agent, or Firm* — Brundidge & Stanger, P.C.

(57) ABSTRACT

Provided is a disk controller comprising a front end FC I/F to a host, a back end FC I/F to a magnetic disk, a processor, and a main memory section. The front end I/F and the back end I/F are provided for performing information exchange with a network (connected) device that is connected to a network and manages storage. The main memory section stores registered information expressing an attribution of the network (connected) device, access information including security and performance of each network (connected) device through the network, and ranking information assigning a rank to each network (connected) device based on the registered information and the access information. An appropriate network (connected) device is selected from various types of information including the ranking information.

12 Claims, 7 Drawing Sheets

U.S. PATENT DOCUMENTS

| | | |
|---|---|---|
| 7,302,498 B2 | 11/2007 | Tanaka |
| 2002/0161933 A1 | 10/2002 | Shanthaveeraish et al. |
| 2003/0018656 A1 | 1/2003 | Schutzman et al. |
| 2003/0026030 A1 | 2/2003 | Koizumi et al. |
| 2003/0105830 A1 | 6/2003 | Pham et al. |
| 2003/0165160 A1 | 9/2003 | Minami et al. |
| 2003/0172149 A1 | 9/2003 | Edsall et al. |
| 2004/0039883 A1* | 2/2004 | LaBerge et al. ............... 711/155 |
| 2004/0143734 A1* | 7/2004 | Buer et al. .................... 713/153 |
| 2004/0165588 A1* | 8/2004 | Pandya ......................... 370/389 |
| 2005/0097335 A1 | 5/2005 | Shenoy et al. |
| 2005/0210130 A1 | 9/2005 | Tanaka |

FOREIGN PATENT DOCUMENTS

| | | |
|---|---|---|
| WO | 9425919 | 11/1994 |
| WO | 03001872 | 1/2003 |
| WO | 03021441 | 3/2003 |

* cited by examiner

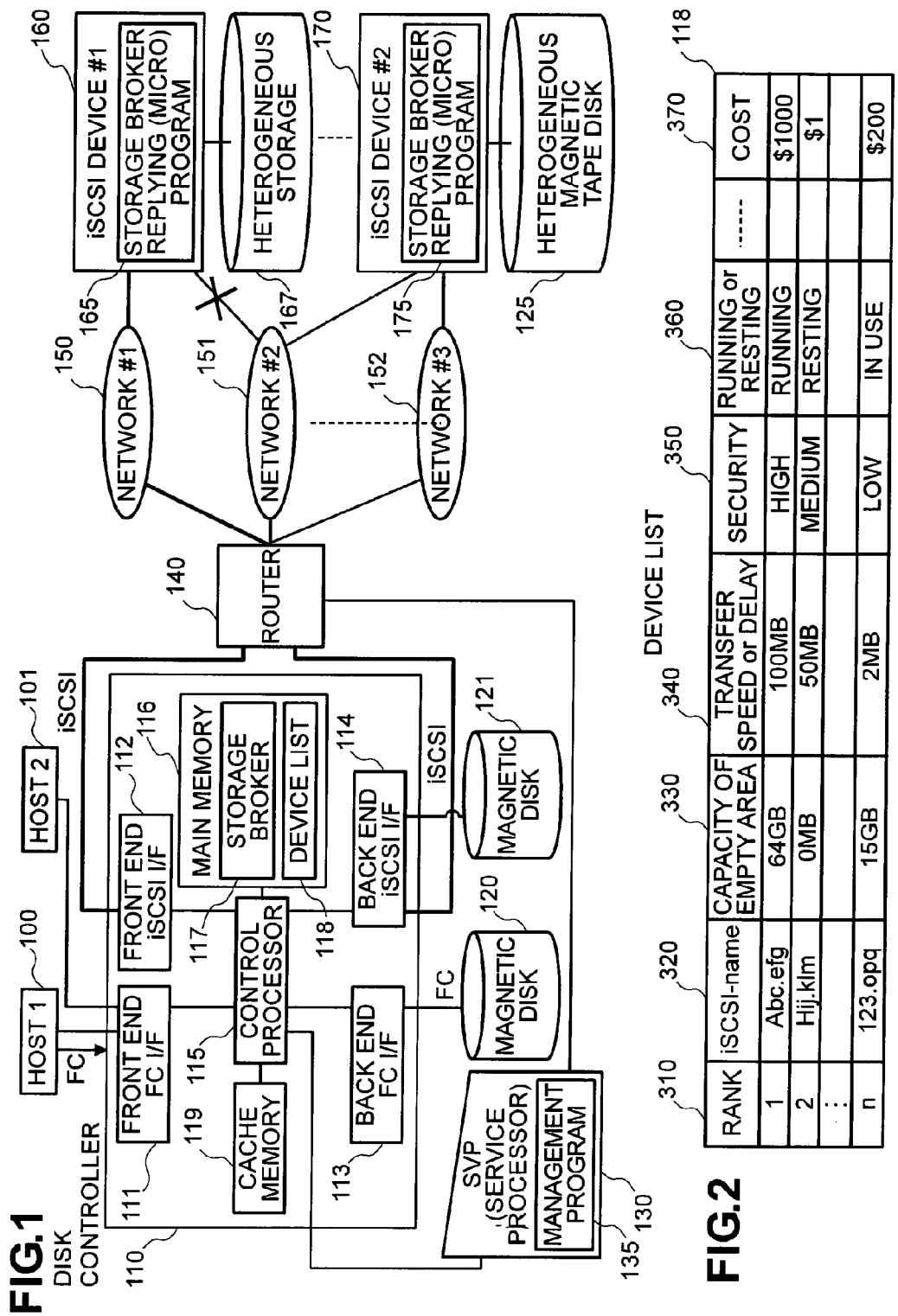

DISK CONTROL UNIT AND STORAGE SYSTEM

CROSS-REFERENCES TO RELATED APPLICATIONS

The present application is a continuation of application Ser. No. 10/923,732, filed Aug. 24, 2004, now U.S. Pat. No. 7,600,047; which is a continuation of application Ser. No. 10/852,111, filed May 25, 2004, now U.S. Pat. No. 7,302,498; which relates to and claims priority from Japanese Patent Application No. 2004-082824, filed on Mar. 22, 2004, the entire disclosure of which is incorporated herein by reference.

BACKGROUND OF THE INVENTION

1. Field of the Invention

The present invention relates to a storage system, and a management method for such storage system, having a disk controller and an iSCSI device connected to the disk controller by a network. More particularly, the present invention relates to a format for managing storage connections on the network.

2. Description of the Related Art

As IT becomes more widespread and entrenched, users continue to seek greater storage capacity. Because of this, there are many cases where more storage is necessary than the capacity originally installed in a storage system.

FIG. 8 shows an example of an overall construction of a disk controller and a storage system in accordance with a conventional example. In the conventional technique shown in FIG. 8, an operation input and a management program 235 on an SVP (Service Processor) 230 issue an instruction to a control program 217 and a device list 218 inside a disk controller 210 to register new storage as storage to be governed by the disk controller 210 itself, and to connect a corresponding new magnetic disk 220 to a back end FC I/F 213, whereby achieving extension of storage capacity.

In another method for increasing storage capacity, instead of the magnetic disk 220, FC heterogeneous storage 227 having an FC device 225 is connected. Here, "storage" refers collectively to magnetic disks, magnetic tape, etc. "Heterogeneous storage" refers to any storage medium that the disk controller does not manage directly. Also, "FC" is an abbreviation for Fiber Channel. An example of an FC storage system is illustrated in an IBM white paper called "IBM Storage Tank™, A Distributed Storage System", dated Jan. 24, 2002.

As shown in FIG. 8, when making a remote copy or a backup of data, the storage where the remote copy is to be made does not necessarily have to be recognized by the disk controller as storage governed by the disk controller 210 itself. Therefore, it is also possible to use a SAN (Storage Area Network) 250 to connect a heterogeneous storage 229 having a front end FC I/F 212 and an FC device 260. An example of such a construction is disclosed in U.S. Pat. No. 6,092,066.

On the other hand, in an IP network, transmissions can only be performed in accordance with TCP/IP protocol, for example. Therefore, in order to directly send SCSI protocol, which is common for disk unit I/O, the disk unit, a new protocol is necessary to piggyback common SCSI commands and the like onto the data portion of an IP frame. A representative example of this new protocol is iSCSI protocol.

An example of a storage system using iSCSI is shown in U.S. Pat. No. 5,996,024. This type of iSCSI I/F can transmit information about a magnetic disk, which is the target, to the disk controller, which is an initiator. In the storage system using the FC I/F as described above, the network is closed inside the disk controller. Therefore, since it is possible to learn the status of everything including the status of the FC heterogeneous storage and the status along the route thereto, it is possible to select the optimum storage when recording data.

However, in the FC I/F storage system described above, it is not possible to connect an IP network and iSCSI heterogeneous storage that are spread widely around the world. Therefore, in order to create a network on an IP-network scale, it is necessary to set up a separate network with just the FCs. Furthermore, management methods used on IP networks cannot be simply transferred and used on the storage system using the FC I/F described above.

In order to add more storage using the FCs and the SAN as disclosed in U.S. Pat. No. 6,092,066, it is necessary to establish the SAN network separately from the general IP network. This creates problems of increased equipment costs and management costs.

On the other hand, with the iSCSI I/F using the IP network, the iSCSI storage can be connected as the target, but only information about the target can be transmitted. Therefore, it is not possible to learn information about the performance of the network leading to the iSCSI storage, nor security, costs, or other such information about the IP network. Therefore, there was a problem in that it was not possible to connect optimally to the iSCSI heterogeneous storage in a way which took the status of the network into consideration.

SUMMARY OF THE INVENTION

In order to solve the above-mentioned problems, the present invention adopts mainly the following construction.

In a disk control unit comprising a front end FC I/F which is an interface to a host, a back end FC I/F which is an interface to a magnetic disk, a processor for controlling each section, and a main memory section, a front end I/F and a back end I/F are provided to perform exchanges of information with network (connected) devices that are connected to a network and manage storage; the main memory section stores registered information expressing an attribution of the network (connected) devices, access information including information about security and performance of each network (connected) device through the network, and ranking information assigning a rank to each network (connected) device based on the registered information and the access information; and an appropriate network (connected) device is selected from various types of information including the ranking information stored in the main memory section, based on a condition requested by the computer.

In the disk control unit, communication with the network (connected) devices uses iSCSI protocol or IP protocol.

BRIEF DESCRIPTION OF THE DRAWINGS

FIG. 1 is a diagram showing an example of an overall construction of Embodiment 1 of a disk controller and a storage system;

FIG. 2 is a structural diagram of a device list in accordance with Embodiment 1 of the device control unit;

DETAILED DESCRIPTION OF THE PREFERRED EMBODIMENTS

Figure 3:
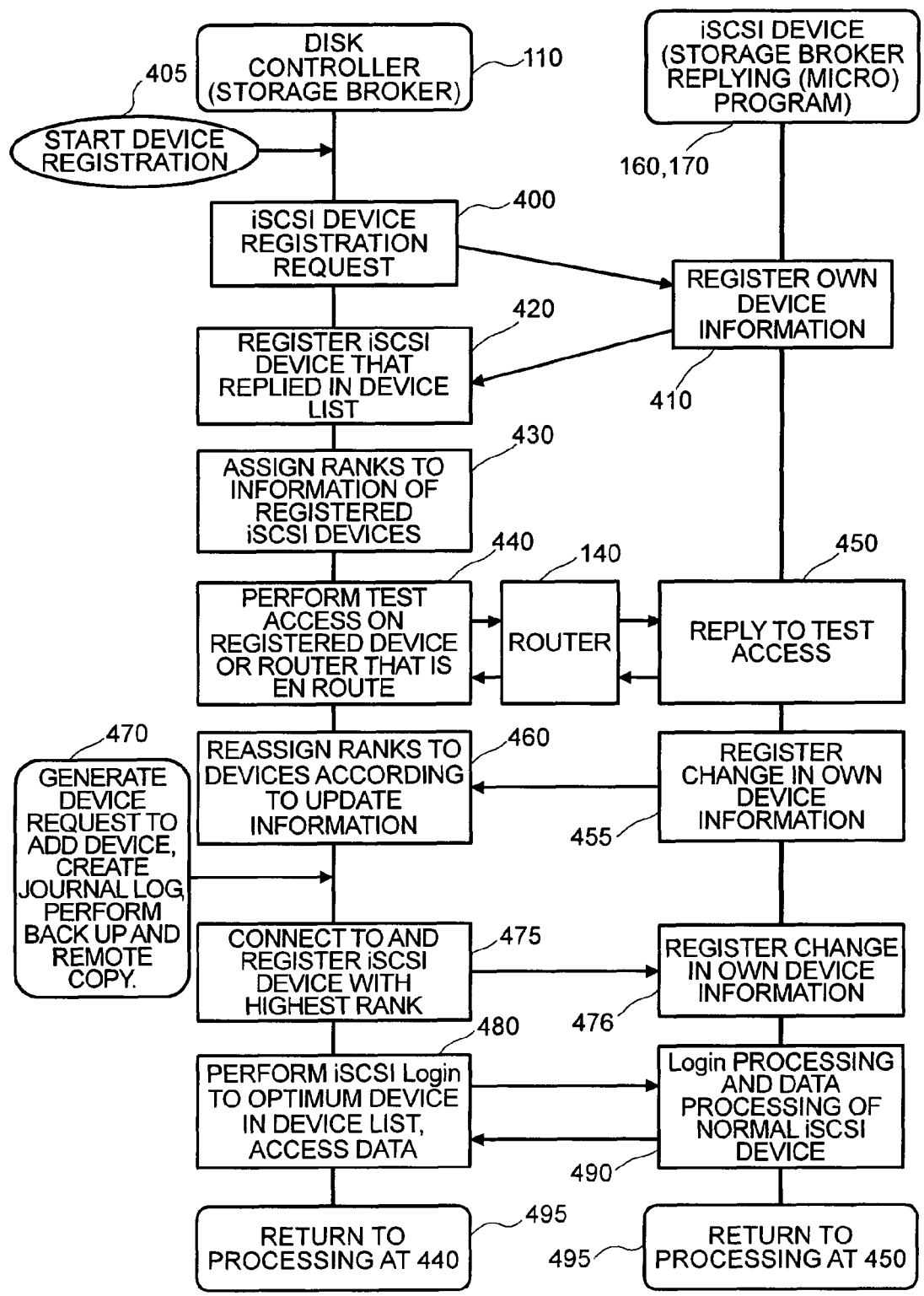
FIG. 3 is a flow chart showing an example of device registration, testing, updating and accessing between the disk controller and an iSCSI device in accordance with Embodiment 1.

Embodiments of a disk controller of the present invention are explained in detail below, with Embodiment 1 and Embodiment 2 given as examples, and with reference made to the diagrams.

FIG. 1 is a diagram showing an overall construction of Embodiment 1 of a disk controller and a storage system. In FIG. 1, a host 1 (100) and a host 2 (101) are connected to a disk controller 110 via a front end FC I/F 111, and can read and write data using FC protocol. The disk controller 110 controls data between the computer (below, "host") 100 and the host 2 (101) and a magnetic disk 120. Furthermore, inside the disk controller 110, there is provided a front end iSCSI I/F 112, which is an interface to IP networks 150, 151, 152. Here, the front end iSCSI I/F 112 is used, for example, as an interface to heterogeneous storage (any storage which is not directly managed by the disk controller) for making a remote copy or a backup of data.

The disk controller 110 has a back end FC I/F 113 as an interface to the magnetic disk 120, and the magnetic disk 120 is connected to the back end FC I/F 113. Furthermore, the disk controller 110 has a back end iSCSI I/F 114 and is connected to a magnetic disk 121, and the magnetic disk 121 is managed directly. Furthermore, the disk controller 110 has the back end iSCSI I/F 114 as an interface to iSCSI devices 160, 170 on the network, which are external devices connected via the networks 150, 151, 152. In other words, a router 140 or the iSCSI devices 160, 170 are connected to the backend iSCSI I/F 114 as devices on the network. Here, the router 140 may also be a network switch.

Furthermore, the iSCSI devices 160, 170 are connected to the front end iSCSI I/F 112 inside the disk controller 110 via the router 14 and the networks 150, 151, 152. Information is exchanged between the front end and the iSCSI devices. Furthermore, a cache memory 119 is provided along the route where the data is transferred from the front end FC I/F 111 to the back end FC I/F 113. The cache memory is used for high-speed data access.

The entire disk controller 110 is controlled by a control processor 115. Programs, tables, lists, etc. are stored in a main memory 116. Furthermore, in order to enable structural changes, monitoring, controls, etc. to be made to the disk controller 110 from an external location, the disk controller 110 is provided with a SVP (service processor) 130 containing a management program 135. The SVP is connected to the control processor 115. The SVP 130 may be subordinate to the disk controller 110 and perform functions of a personal computer. In this case, a user can give instructions to the control processor 115 by performing input operations on the SVP 130. Furthermore, the SVP 130 may be connected to the disk controller 110 via a network and perform functions similar to the hosts. Among the programs stored in the main memory 116, there is a storage broker 117 as a program according to the present invention. This program performs control of the iSCSI devices. Moreover, the main memory 116 has a device list 115 serving as a database storing information that is necessary when connecting to the iSCSI devices 160, 170.

The front end iSCSI I/F 112 and the back end iSCSI I/F 114 are connected via the router 140 to the networks 150, 151, 152, and the router 140 sends IP packets from each interface to the networks 150, 151, 152 in such a manner as correctly corresponds to the addresses of the IP packets. On the other hand, the iSCSI devices 160, 170 are connected to the networks 150, 151, 152. Inside the iSCSI devices 160, 170 are provided storage broker replying (micro) programs 165, 175 as programs for exchanging information with the storage broker 117.

The storage connected to the iSCSI devices 160, 170 includes, for example, iSCSI heterogeneous storage 167 and a heterogeneous magnetic tape disk 125 and the like, which are not directly managed by the disk controller 110. Thus, by connecting the disk controller 110 and the iSCSI heterogeneous storage 167 and the like, it becomes possible to freely add voluminous storage beyond the capacity of the FC I/F magnetic disk 120 that is under the direct management of the disk controller 110.

Furthermore, for information about the networks 150, 151, 152 (e.g., their performance, security, cost, etc.) it is possible to use information stored in the router 140. This information can be utilized by applying the protocol that is normally used. SNMP is for example. Information about the iSCSI devices 160, 170 can be collected during negotiation and other procedures performed during iSCSI Login processing. Ranking of the iSCSI devices 160, 170 will be explained below, using a device list in FIG. 2.

Here, the device registration, deletion, test accessing and transmission/reception of data that the storage broker 117 of the disk controller 110 performs over the network with the storage broker replying (micro) programs 165, 175 in the iSCSI devices 160, 170 are performed via the front end iSCSI I/F 112 or the back end iSCSI I/F 114. That is, based on an instruction from the control processor 115 that controls the overall disk controller 110, the storage broker 117 sends a device registration request and the like (see step 400 in FIG. 3 described below) through the front end iSCSI I/F 112 or the back end iSCSI I/F 114 to the iSCSI devices 160, 170.

Methods for the control processor 115 to manage the iSCSI devices 160, 170 on the network include: a first method, in which the control processor 115 manages everything just like the magnetic disk 121 which the control processor 115 itself governs, or a second method, in which the management is yielded to the iSCSI device. If the first method is used, the control processor itself manages the iSCSI devices 160, 170 on the network, so data distribution and other detailed controls become possible. If the second method is used, the control processor yields the data management to the iSCSI devices on the network, and thus it becomes possible to reduce the control processor's management overhead. Whether to use the first method or the second method may be determined by the control processor based on it's own load, or by an instruction from the SVP by the user.

Here, the device registration, deletion, test accessing and transmission/reception of data that the storage broker 117 performs with the storage broker replying (micro) programs 165, 175 of the iSCSI devices 160, 170 on the network are executed according to controls by the control processor 115. However, the control processor can use either the front end iSCSI I/F 112 or the back end iSCSI I/F 114 to execute the registration, etc. Basically, it is not necessary to distinguish between usage the front end I/F and the back end I/F, so either end I/F may be used. In a typical example of usage, for backing up and for remote copying, the control processor may perform controls so that the front end I/F is used. For adding disks (this is process enables the disk controller to use heterogeneous storage present broadly through the IP network) controls may be performed to use the back end I/F (adding a magnetic disk to be managed directly by the control processor is similar to the normal processing method using the back end I/F.) Furthermore, whether to use the front end I/F or the back end I/F may be determined by the control processor according to an instruction from the SVP made by the user.

As shown in FIG. 1, each of the iSCSI devices 160, 170 can be connected to each of the networks 150, 151, 152 as a way to deal with a case where an accident occurs on one of the networks. In FIG. 1, the X mark on the connection line between the network and the iSCSI device indicates a network accident. Also, in FIG. 1, in response to the data write request from the host, the disk controller 110 generally selects the magnetic disks 120, 121 that are directly managed by the disk controller, but in the case of a request to write voluminous data that cannot all be stored on the magnetic disks 120, 121, or in a case where the capacity of empty space on the magnetic disks 120, 121 has become small, or in a case where copy data is to be stored onto a storage medium other than the magnetic disks 120, 121, the data is written onto the external heterogeneous storage or heterogeneous storage medium via the network.

FIG. 2 is a structural diagram of a device list according to Embodiment 1 of the disk controller. In FIG. 2, Rank 310 indicates a priority level with which a new connection will be made to each registered iSCSI device on the network in response to a request from the host or the SVP. ISCSI-Name 320 indicates an address of each iSCSI device. Capacity of Empty Area 330 indicates usable data capacity in each iSCSI device. Transfer Speed or Delay 340 indicates a data transfer speed or amount of time required to transfer data, which should be expected when accessing each of the iSCSI devices.

Furthermore, in the device list 118, Security 350 indicates the safety of the routes from the iSCSI devices 160, 170 to the disk controller 110, as determined based on the number of incidences that have occurred there in the past, the security configured there, etc. Running or Resting 360 indicates the current running state of each iSCSI device 160, 170. Cost 370 indicates the cost necessary to use each iSCSI device 160, 170.

Using each of these entries, the storage broker 117 determines the rank of each of the registered iSCSI devices 160, 170 as relevant to a condition requested by the disk controller 110. Here, the requested condition may be, for example, a condition requiring that voluminous writing be necessary, a condition requiring that the data to be handled be important or confidential, or a condition requiring that the disk controller itself have detected and learned its own load status, for example, such as how fast or slow its transfer speed is, or the volume that is too large to write, etc.

An example of a way to determine the rank is to assign ranks to the entries from 320 to 370 for each device, and then, based on the condition requested by the disk controller 110, assign weight to those entries which are considered important, and then total these up to calculate the ultimate rank. A specific method for assigning the ranks could be, for example to numerically express (standardize) those which can be numerically expressed as "Xij" (where "i" represents the device names written vertically in FIG. 2, and "j" represents the entries written horizontally in FIG. 2), and then multiply these by weights W1, W2, W3, . . . Wi provided by the SVP 130 (where a greater value of "Wi" indicates greater importance), and then assign the ranks according to the size of the value (Rank-i) thus produced.

Rank1=$W1 \times X11 + W2 \times X12 + W3 \times X13 + \ldots$

Rank2=$W1 \times X21 + W2 \times X22 + W3 \times X23 + \ldots$

There is also a method for expressing those which cannot be numerically expressed as rules (such as whether the device is running or resting). For example, the rule may be expressed as "if i=running, then Rank-i=R1; else Rank-i=0 (where R1 is a value determined in advance)".

Furthermore, since the SVP 130 is connected via the router 140 and the networks 150, 151, 152 to each of the iSCSI devices and thus has connections similar to the control processor 115, the SVP 130 can also perform the ranking of each of the registered iSCSI devices similarly to how ranking is performed by the control processor 115 as described above. The results of the ranking are stored in the device list 118 via the control processor. Note that it is self-evident that the user can add entries that are necessary besides those shown in FIG. 2.

FIG. 3 is a flow chart showing an example of device registration, testing, updating and accessing between the disk controller and the iSCSI device on the network in accordance with Embodiment 1. In FIG. 3, first, a device registration start command is transmitted from one of the hosts 100, 101 or the SVP 130 to the disk controller 110 (405). The control processor 115 of the disk controller 110 issues an iSCSI device registration request to the network's iSCSI devices 160, 170 and storage broker replying (micro) programs 165, 175 (400). The iSCSI devices 160, 170 that received the request then register their own device information (410). Next, based on controls by the control processor 115, the storage broker 117 registers the iSCSI device(s) that replied into the device list 118 (420).

Then, the storage broker 117 assigns ranks to the information of the registered iSCSI devices (430). Furthermore, the storage broker 117 performs a test access to the registered iSCSI devices(s) or the router 140 that is en route thereto, and collects information about the network status, etc. (440).

The router 140 or iSCSI devices 160, 170 on which the test access was performed then reply to the test access (450). If the iSCSI devices 160, 170 have had their own device information (e.g., their capacity of empty area, etc.) updated, they register the change in information with the storage broker 117 (455). Once the information is finished being changed with the storage broker 117, the storage broker 117 assigns ranks to the iSCSI device information once again (460).

After that, when a device request to add a device or create a journal log or perform a backup or a remote copy is sent to the storage broker 117 from an external location (e.g., the host or SVP) (470), a connection is then established to the iSCSI device with the highest rank and this device is registered (475). When this registration is performed, the registered iSCSI device also changes the registration of its own device information (476).

Here, step 475 is processing to add new storage to the disk device that is already present and under the management of the disk controller. The decision to add the storage is made according to the capacity of the magnetic disks being managed by the disk controller. That is, the request to add the storage is made when the existing disk capacity will not satisfy the write request from the host (when safety factors are also considered). Also, in addition to the current disk capacity, the decision to add the storage can also be made according to the I/O transaction number, transfer rate, control processor usage rate or other aspect of the performance of the disk controller itself. That is, a method is used in which the disk controller judges the decrease in the I/O transaction number or the like and then yields the storage management to the iSCSI devices, and the new storage is added.

Then, the storage broker 117 chooses the iSCSI device with the highest rank in the device list 118, and according to this selection the disk controller 110 performs the iSCSI login and the data access (480). The accessed iSCSI device 160, 170 then performs normal iSCSI command processing (490). After that, the processing performed by the storage broker 117 returns to 440, and the storage broker replying (micro) programs 165, 175 return to 450.

Note that the disk controller can also perform deletion of the registered iSCSI device as part of the normal processing. When the registered iSCSI device breaks down, or the network performance of the iSCSI device deteriorates, the disk controller performs processing to delete the information for the corresponding iSCSI device from the device list and inform the iSCSI device that it has been cut off from the disk controller.

Thus, by performing the test registration and the testing via the router and the network, the disk controller can obtain the information about the devices connected on the network and the security information that is obtained when each device is accessed, etc. Based on this information, the devices are then ranked, which is then stored in the device list serving as the database. The optimum network device can then be selected based on the rankings in the device list. Note that, in certain cases (such as when there is a request from the user) the network device can be selected according to items other than the rankings.

Figure 4:
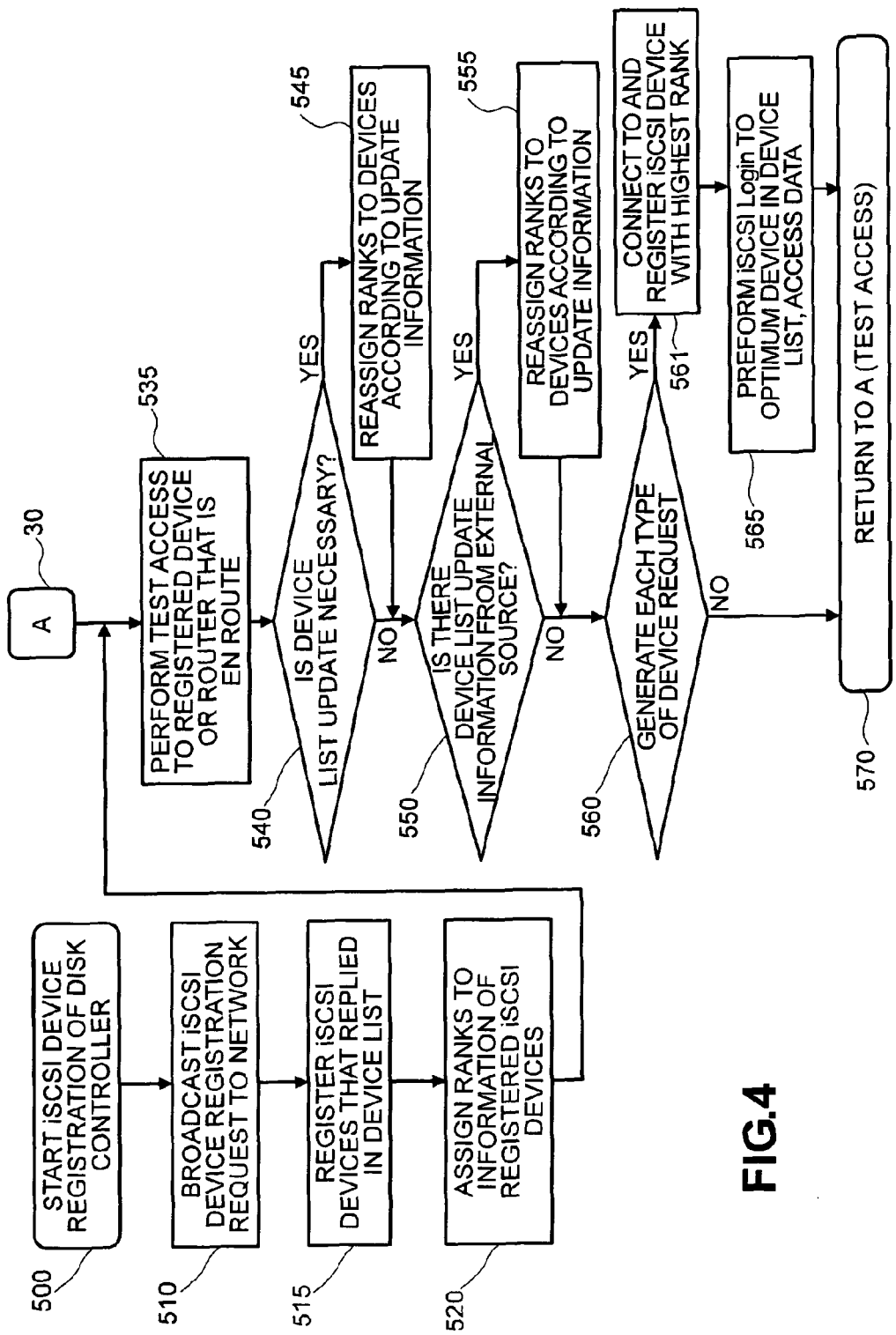
FIG. 4 is a diagram showing a flowchart of device registration, testing, updating and accessing by a storage broker device inside the disk controller in accordance with Embodiment 1.

FIG. 4 is a diagram showing a flowchart of registration, testing, updating and accessing by the storage broker device in accordance with Embodiment 1. In FIG. 4, first, in response to the device registration request from the host 100, 101 or the SVP 130, the registration of the iSCSI device in the disk controller 110 (or, more specifically, in the storage broker 117) is started (500). Next, the disk controller 110 broadcasts the iSCSI device registration request on the network (510). The disk controller 110 registers the iSCSI device that replied into the device list 118 (515), and assigns the rank within the registered device list 118 (520). The test access is then performed on the registered device or the router 140 (535). Next, a check is performed to determine whether or not the device list 118 needs to be updated (540).

If the update is necessary, then the disk controller 110 re-assigns the ranks to the devices in accordance with the update information (545). If an update is not necessary, then the check is performed to determine whether or not there is device list update information from an external location (550). If an update is necessary, then the ranks are re-assigned to the devices in accordance with the update information (555). If the update is not necessary, then a check is performed to determine whether or not there are various types of device requests (560). If a device request has occurred, then a connection is made to the iSCSI device with the highest rank and this device is registered (561). The processing at step 561 corresponds to the processing at step 475 shown in FIG. 3, and the judgment to add the newly connected storage is made similarly to that in step 475 in FIG. 3. Next, based on the occurrence of the device request, the iSCSI Login and the data access are then executed for the optimum device in the device list 118 (565). If there is no request, or after the request processing is completed, then the procedure returns to test access A at 535 (570).

Figure 5:
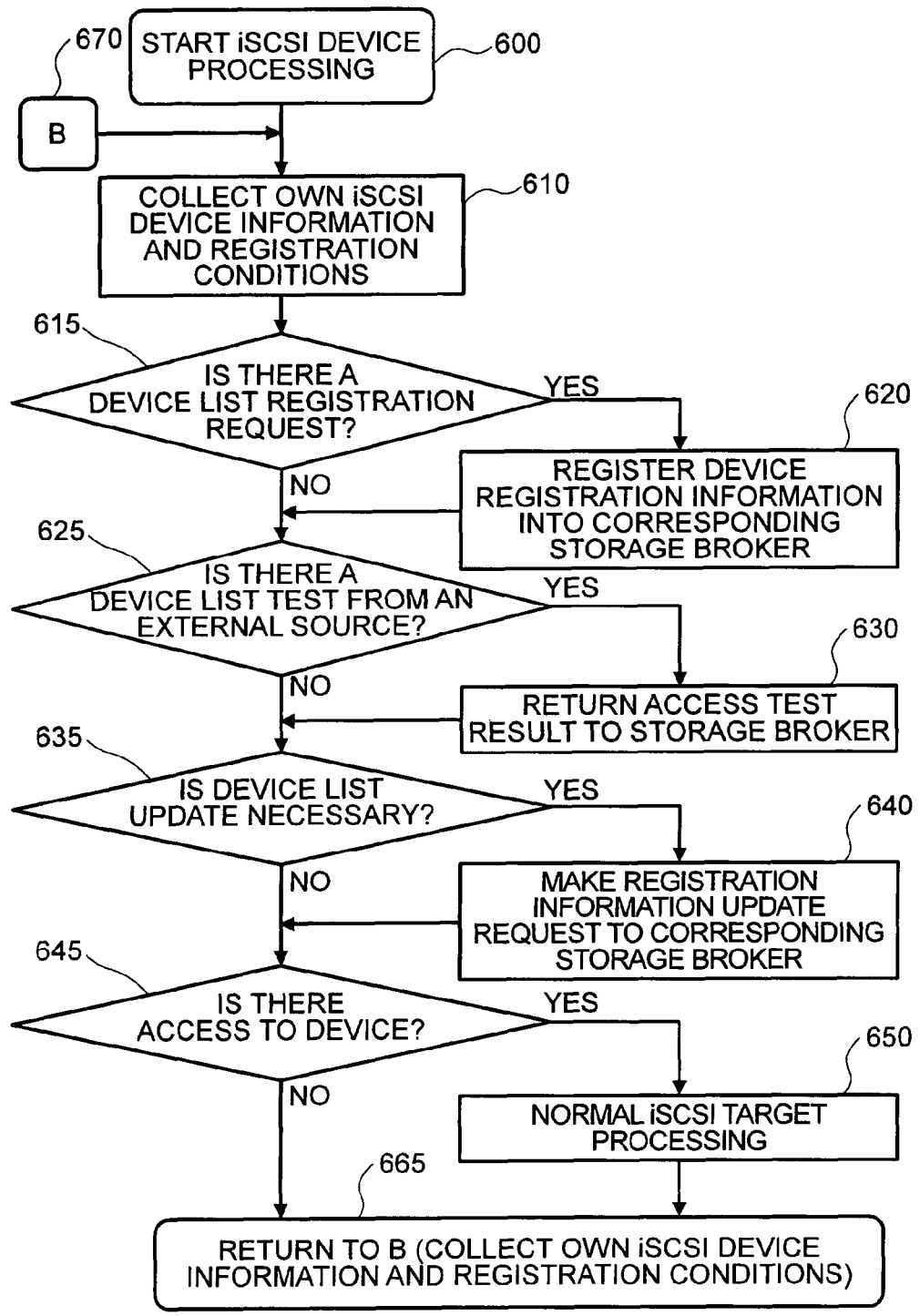
FIG. 5 is a diagram showing a flowchart of iSCSI device registration, test reporting and a device list change, in accordance with Embodiment 1.

FIG. 5 is a diagram showing a flowchart of iSCSI device registration, test reporting and a device list change, in accordance with Embodiment 1. In FIG. 5, first, the iSCSI device starts iSCSI device processing (600). Next, the iSCSI device collects its own iSCSI device information and registration conditions (610). Next, the iSCSI device checks to determine whether or not there is a device list registration request from the disk controller (615). If there is a registration request, then the device information is registered into the corresponding storage broker 117 in the disk controller. Next, the iSCSI device checks to determine whether or not a test access has been performed from an outside location (625). If access has been performed, then the iSCSI device replies to the storage broker 117 with the results of the access test (630). Furthermore, the iSCSI device checks to determine whether or not the update list 118 needs to be updated (635). If the update is necessary, then the registered information is updated in the corresponding storage broker 117 (640).

Next, the iSCSI device checks whether the device has been accessed (645). If the device has been accessed, then normal iSCSI device target processing is performed (650). If the device has not been accessed, then the procedure returns to step 610 where the iSCSI device collects its own iSCSI device information and registration conditions.

Figure 6:
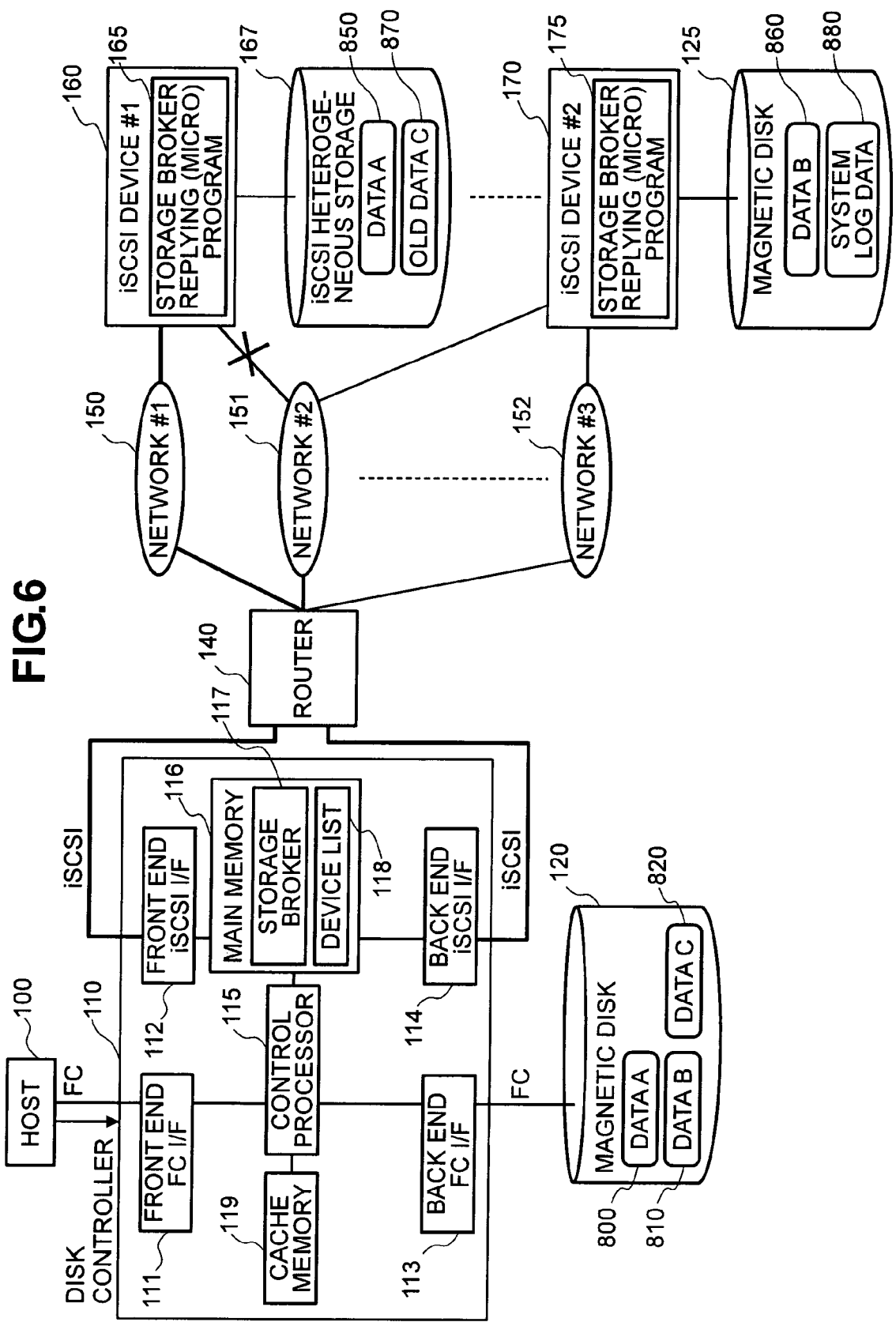
FIG. 6 is a diagram showing an example of mirroring, backing up and storage of system log data in accordance with Embodiment 1 of the disk controller.

FIG. 6 is a diagram showing an example of mirroring, backing up and system log data storage in accordance with Embodiment 1 of the disk controller. In FIG. 6, when mirroring is to be performed, data A 800 is stored as master data on the magnetic disk 120. On the other hand, data A 850 is stored as slave data in the iSCSI heterogeneous storage 167 as the data A 850. When this is performed, the data A 800 and the data A 850 are synchronized.

When a backup is to be performed, data C 820 is stored as master data on the magnetic disk 120. On the other hand, backup data is stored as old data C 870 in the iSCSI heterogeneous storage 167. Furthermore, the disk controller records the storage system's access status. When an accident occurs, the old data C 870 from the backup data is used, and system log data 880 for restoring the original data is stored onto a magnetic disk 125 where broad capacity is available in the first place.

As explained above, when Embodiment 1 of the disk controller is used, wide-ranging storage connected to the IP network becomes usable, and the desired storage capacity can be realized. Note that, Embodiment 1 was explained with respect to the construction in which the disk controller has the magnetic disk 120 which the disk controller manages directly. However, in the disk controller of Embodiment 1, the subject of the invention is that it can be connected over the network to the storage or the magnetic disks. Therefore, the present invention is not restricted to the construction explained above. A construction which does not have the directly managed magnetic disk naturally falls within the scope of the present invention as well. (This is also the same for Embodiment 2.)

Figure 7:
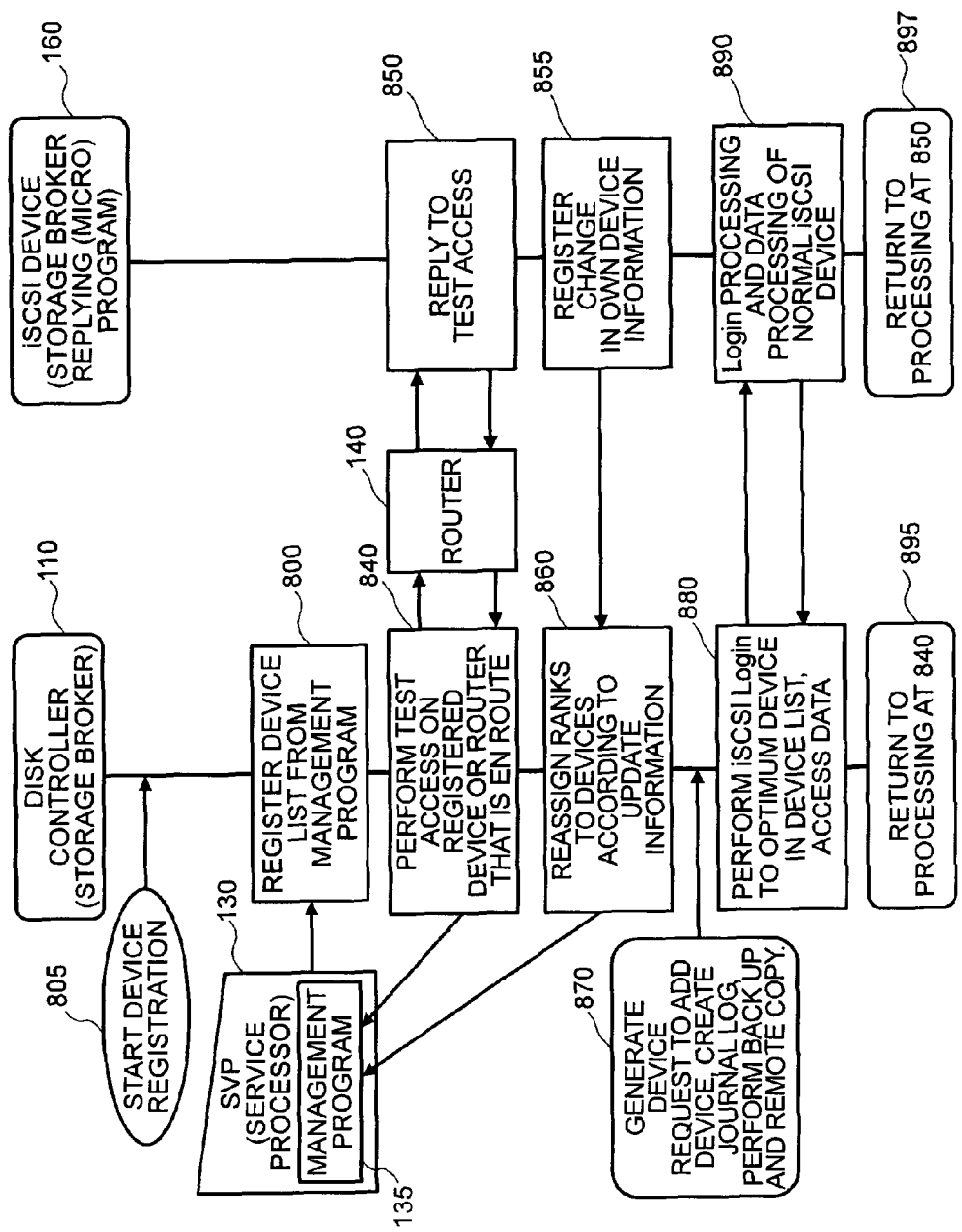
FIG. 7 is a flowchart showing an example of device registration, testing, updating and accessing between a disk controller and an iSCSI device in accordance with Embodiment 2 of the disk controller.
Figure 8:
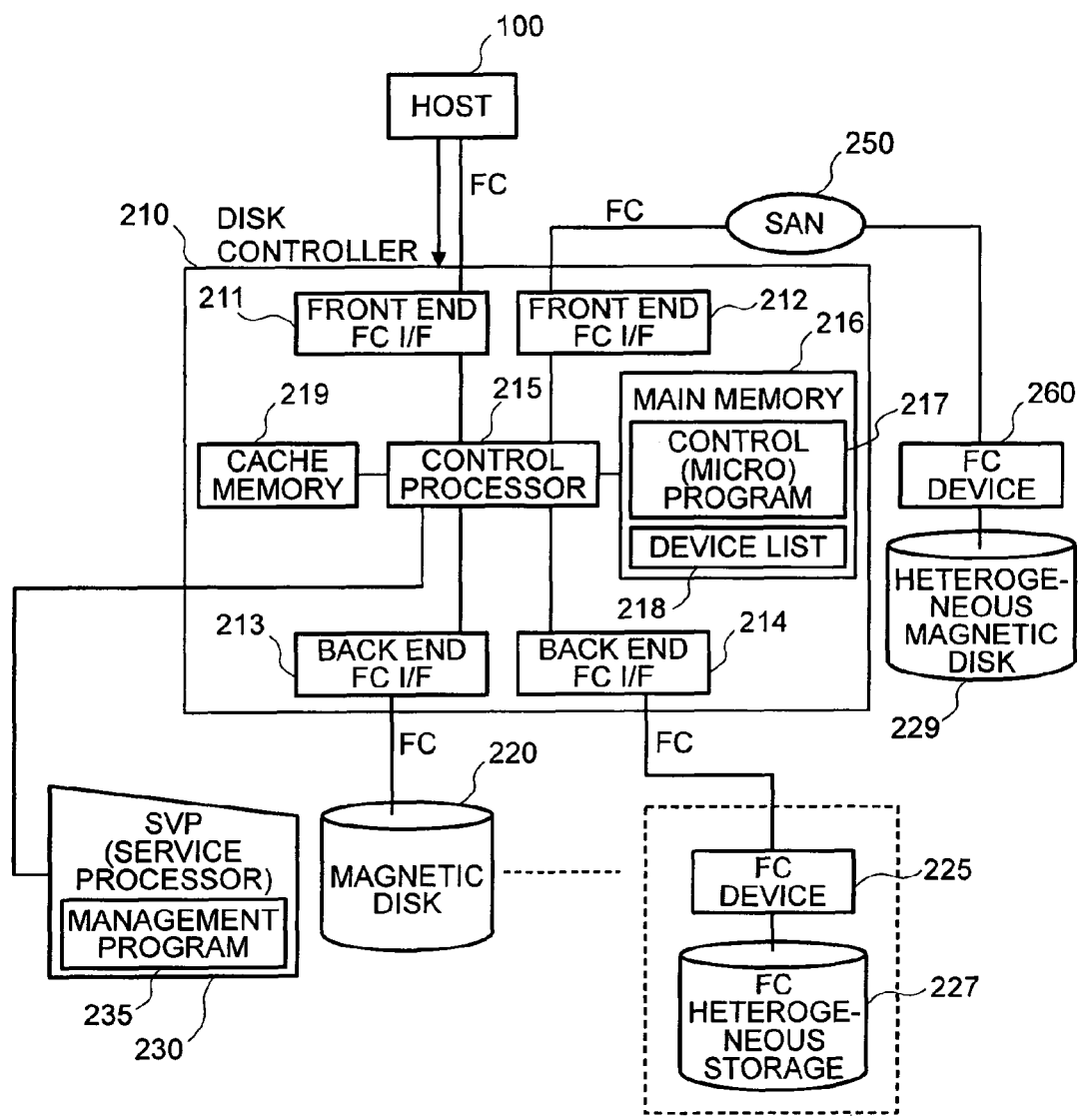
FIG. 8 is a diagram showing an overall construction of a disk controller and storage system in accordance with a conventional example.

FIG. 7 is a diagram showing an example of device registration, testing, updating and accessing between a disk controller and an iSCSI device in accordance with Embodiment 2. In FIG. 7, first, a command to start device registration is sent to the disk controller 110 from one of the hosts 100, 101 or the SVP 130 (805). Next, device list registration is performed according to an operation input from the SVP 130 or the management program 135 (800). Then, the disk controller 110 performs a test access to the iSCSI device or the router, obtains necessary information, and transmits this to the SVP 130. Next, if there is a change in the iSCSI device information (such as a change in the capacity of empty area) (855), the storage broker 117 assigns the device ranks in accordance with this update information (860), and then transmits these rankings to the SVP.

In FIG. 7, all of the data to be written into the device list 118 is disclosed from the SVP 130 (800, 840, 860). In other words, in Embodiment 2, the SVP 130 gives instructions for the processing of step 400 (the iSCSI device registration request), step 410 (the device's own information registration), and step 420 (the registration of the iSCSI device that replied into the device list), which are shown in FIG. 3. The subsequent data flow is similar to FIG. 3.

Thus, when Embodiment 2 is used, the procedures can progress without spending time on registering and checking the devices. Furthermore, the ranking of the registered iSCSI devices can also be performed by the SVP 130 like the ranking performed by the control processor 115 as described above. (See the description of ranking in Embodiment 1.)

As explained above, the disk controller of the present invention can be summarized as follows: In a conventional FC device heterogeneous connection, iSCSI devices connected on a common IP network cannot be used to connect heterogeneous storage. Furthermore, when FCs are used to build a SAN, equipment costs become expensive, and in a case where common iSCSI devices are connected, it is difficult for the disk controller side to accurately learn the status of the devices, so the heterogeneous connection could not be established easily. In order to overcome these problems, in the present invention, the device list is provided inside the disk controller in order to register the status of the externally connected IP network, the capacity of the iSCSI devices, the transfer rate, security, etc., and to assign the ranks. Furthermore, at regular intervals the storage broker in the disk controller updates the various conditions. When the request is made for the needed iSCSI device, the iSCSI device is connected based on the device list. Thus, it becomes possible to always select the optimum iSCSI device in terms of capacity, performance, security and cost. It also becomes possible to perform the optimum heterogeneous storage connection on the IP network.

In accordance with the present invention, the iSCSI I/F can be used to optimally select from many heterogeneous storage entities existing externally via the IP network. Therefore, costs can be reduced and storage capacity can be expanded.

What is claimed is:

1. A disk control unit comprising:
    a plurality of interfaces (I/Fs);
    a processor for controlling the plurality of I/Fs; and
    a main memory section,
    wherein the plurality of I/F exchange information with a plurality of Internet Small Computer System Interface (iSCSI) devices via a network connected between the iSCSI devices and the plurality of I/Fs,
    wherein each of the iSCSI devices manages a storage,
    wherein the main memory section stores registered information expressing an attribution of each of the iSCSI devices including capacity information indicating a capacity of the storage of each iSCSI device, access information indicating security and performance of each of the iSCSI devices through the network, and ranking information assigning a rank to each of the iSCSI devices based on the registered information and the access information,
    wherein the processor selects an appropriate iSCSI device according to various types of information including the ranking information stored in the main memory section,
    wherein said capacity information of the storage of each iSCSI device is collected during SCSI login processing to said iSCSI devices, and
    wherein said access information indicating security and performance of each of the iSCSI devices is collected at a timing of performing a test access to said iSCSI devices.

2. The disk control unit according to claim 1, wherein communication with each of the iSCSI devices uses iSCSI protocol or IP protocol.

3. The disk control unit according to claim 1, wherein the main memory section is provided with a storage broker as a control program for performing control on each of the iSCSI device each of which manages a storage, and is provided with a device list storing the registered information, the access information, and the ranking information.

4. The disk control unit according to claim 1, wherein the processor obtains the registered information from a replying program built into each of the iSCSI devices, and obtains the access information upon accessing each of the iSCSI devices via the network.

5. The disk control unit according to claim 4, wherein a Service Processor (SVP) with a built-in management program is connected to the processor, wherein the processor obtains the registered information and the access information from terminal operations on the SVP, or from the management program.

6. The disk control unit according to claim 4, wherein the processor obtains the registered information and the access information from the network.

7. The disk control unit according to claim 5, wherein the information exchange with each of the iSCSI devices is performed via one of the plurality of I/Fs.

8. The disk control unit according to claim 5, wherein the information exchange with each of the iSCSI devices is performed via another one of the plurality of I/Fs.

9. The disk control unit according to claim 1, wherein each storage managed by an iSCSI device has an iSCSI I/F.

10. The disk control unit according to claim 1, wherein the processor selects an ISCSI device to which to write mirrored data or backup data based on the registered information, the access information and the ranking information.

11. The disk control unit according to claim 1, wherein the processor selects an iSCSI device to which to write log data accessed from the host based on the registered information, the access information and the ranking information.

12. A disk control unit according to claim 1, wherein said processor determines, upon receipt of a write request, whether a capacity of a storage of an iSCSI device being used satisfies the write request, and
    wherein said processor requests the iSCSI device being used to add storage if the capacity of the storage of the iSCSI device being used does not satisfy the write request.

* * * * *